(12) United States Patent
Chen et al.

(10) Patent No.: US 11,171,767 B1
(45) Date of Patent: Nov. 9, 2021

(54) SIGNAL PROCESSING CIRCUIT AND SIGNAL PROCESSING METHOD

(71) Applicant: Realtek Semiconductor Corp., HsinChu (TW)

(72) Inventors: Yun-Tse Chen, HsinChu (TW); Liang-Wei Huang, HsinChu (TW); Chi-Hsi Su, HsinChu (TW); Po-Han Lin, HsinChu (TW)

(73) Assignee: Realtek Semiconductor Corp., HsinChu (TW)

( * ) Notice: Subject to any disclaimer, the term of this patent is extended or adjusted under 35 U.S.C. 154(b) by 0 days.

(21) Appl. No.: 17/227,386

(22) Filed: Apr. 12, 2021

(30) Foreign Application Priority Data

May 6, 2020 (TW) .................................. 109115070

(51) Int. Cl.
*H04L 7/00* (2006.01)
(52) U.S. Cl.
CPC .................................. *H04L 7/0025* (2013.01)
(58) Field of Classification Search
CPC ..... H04L 7/0025; H04L 25/0292; H04L 7/00; H04L 7/0079
See application file for complete search history.

(56) References Cited

U.S. PATENT DOCUMENTS

| | | | |
|---|---|---|---|
| 6,483,793 B1 | 11/2002 | Kim | |
| 8,165,188 B2* | 4/2012 | Shih | H04L 7/033 375/219 |
| 9,667,407 B1* | 5/2017 | Liu | H03B 5/1228 |
| 2006/0083343 A1* | 4/2006 | Roederer | H04L 7/033 375/375 |
| 2007/0047683 A1* | 3/2007 | Okamura | H04L 7/0337 375/355 |
| 2013/0216014 A1* | 8/2013 | Kong | H03L 7/081 375/376 |
| 2014/0086364 A1* | 3/2014 | Schell | H03H 7/21 375/340 |
| 2018/0323871 A1 | 11/2018 | Fan | |

* cited by examiner

*Primary Examiner* — Freshteh N Aghdam
(74) *Attorney, Agent, or Firm* — Winston Hsu

(57) ABSTRACT

A signal processing circuit, which includes: a first clock source, configured to generate a first clock signal; a phase adjusting circuit, configured to receive the first clock signal, and to generate a second clock signal and a third clock signal, wherein the second clock signal and the third clock signal have different phases; an error compensating circuit, configured to compensate an input signal according to an error signal, to generate an compensated input signal; an error calculating circuit, configured to generate the error signal according to the first clock signal, the third clock signal and the compensated input signal; and a receiving end ADC (Analog to Digital Converter), configured to sample the compensated input signal according to the second clock signal.

18 Claims, 5 Drawing Sheets

SIGNAL PROCESSING CIRCUIT AND SIGNAL PROCESSING METHOD

BACKGROUND OF THE INVENTION

1. Field of the Invention

The present invention relates to a signal processing circuit and a signal processing method, and particularly relates to a signal processing circuit and a signal processing method which can use a simple circuit to sample compensated input signals and can select proper sampling phases.

2. Description of the Prior Art

In a conventional signal transceiving circuit, since the same set of circuits is used for signal transmitting and receiving, the received signal and the transmitted signal may interfere with each other. Such issue is called echo. In order to improve the conventional echo problem, error detection is performed to the signal to compensate the input signal. However, the error calculating circuit in the prior art always requires a circuit with a larger area or a more complicated calculation method. Moreover, multiple components in the signal transceiving circuit may sample the same signal, but the value of the sampled signal may be affected by the sampling action. Therefore, if the sampling phases of the multiple components are too close, the sampled values may be incorrect.

SUMMARY OF THE INVENTION

Therefore, one objective of the present invention is to provide a signal processing circuit or a signal processing method which can improve the issue of a conventional error calculating circuit: the circuit often requires a larger area or a more complicated calculating method.

Another objective of the present invention is to provide a signal processing circuit or a signal processing method which can select a proper sampling phase.

One embodiment of the present invention discloses a signal processing circuit, which comprises: a first clock source, configured to generate a first clock signal; a phase adjusting circuit, configured to receive the first clock signal, and to generate a second clock signal and a third clock signal, wherein the second clock signal and the third clock signal have different phases; an error compensating circuit, configured to compensate an input signal according to an error signal, to generate an compensated input signal; an error calculating circuit, configured to generate the error signal according to the first clock signal, the third clock signal and the compensated input signal; and a receiving end ADC (Analog to Digital Converter), configured to sample the compensated input signal according to the second clock signal.

Another embodiment of the present invention discloses a signal processing method, which comprises: (a) generating a first clock signal, a second clock signal and a third clock signal, wherein the second clock signal and the third clock signal have different phases; (b) compensating an input signal according to an error signal to generate an compensated input signal, by an error compensating circuit; (c) generating the error signal according to the first clock signal, the third clock signal and the compensated input signal by an error calculating circuit; and (d) sampling the compensated input signal according to the second clock signal by a receiving end ADC.

In summary, the signal processing circuit and the signal processing method provided in the present invention can perform error compensation (echo suppression) with a simpler circuit and less data, and can improve the issue of a conventional error calculating circuit: the circuit often requires a larger area or a more complicated calculating method. In addition, the sampling phases of different components can have a larger phase difference, so as to improve the inaccuracy of the sampling values due to that the sampling phases are too close.

These and other objectives of the present invention will no doubt become obvious to those of ordinary skill in the art after reading the following detailed description of the preferred embodiment that is illustrated in the various figures and drawings.

DETAILED DESCRIPTION

Several embodiments are provided in following descriptions to explain the concept of the present invention. Each component in following descriptions can be implemented by hardware (e.g. a device or a circuit) or hardware with software (e.g. a program installed to a processor). Also, the term "first", "second", "third" in following descriptions are only for the purpose of distinguishing different one elements, and do not mean the sequence of the elements. The components in the embodiments can be integrated into fewer components or divided into more components under the premise that the overall function remains unchanged.

In following descriptions, a plurality of embodiments are provided to illustrate the signal processing circuit provided by the present invention. Please also note that the signal processing circuit in following embodiments is used as a signal transceiver, but the signal processing circuit provided by the present invention is not limited to being a signal transceiver.

Figure 1:
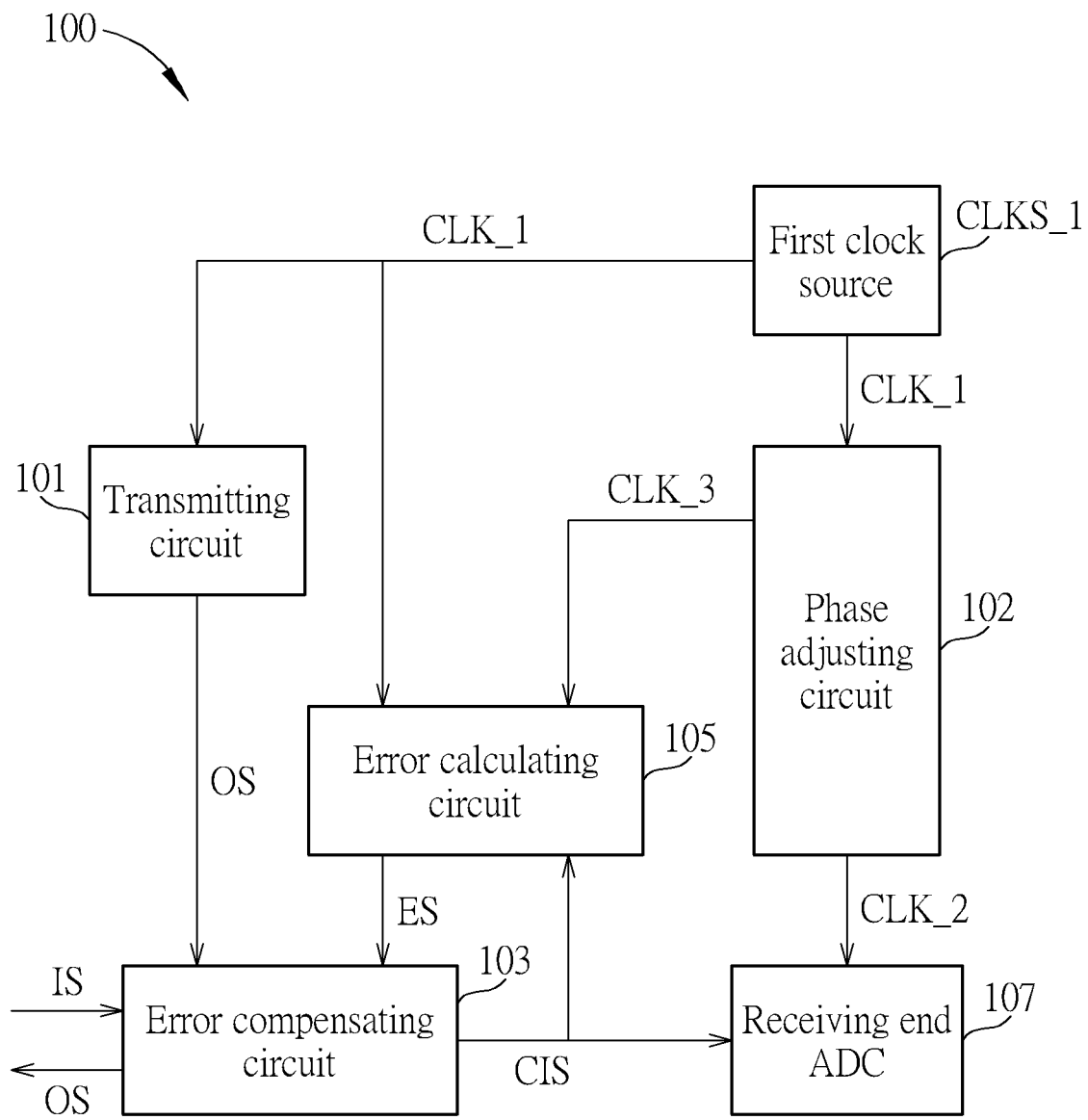
FIG. 1 is a block diagram illustrating a signal processing circuit according to one embodiment of the present invention.

FIG. 1 is a block diagram illustrating a signal processing circuit 100 according to one embodiment of the present invention. As shown in FIG. 1, the signal processing circuit 100 comprises a first clock source CLKS_1, a transmitting circuit 101, a phase adjusting circuit 102, an error compensating circuit 103, an error calculating circuit 105, and a receiving end ADC 107 (Analog to Digital Converter). The first clock source CLKS_1 is configured to generate a first clock signal CLK_1. The phase adjusting circuit 102 is configured to receive the first clock signal CLK_1 to generate a second clock signal CLK_2 and a third clock signal CLK_3, wherein the second clock signal CLK_2 and the third clock signal CLK_3 have different phases. The transmitting circuit 101 is configured to generate an output signal OS according to the first clock signal CLK_1. The error compensating circuit 103 is used to compensate an input signal IS according to an error signal ES to generate a compensated input signal CIS. The error calculating circuit 103 is configured to generate the error signal ES according to the first clock signal CLK_1, the third clock signal CLK_3 and the compensated input signal CIS. The receiving end ADC 107 is configured to sample the compensated input signal CIS according to the second clock signal CLK_2. In one embodiment, the output signal OS generated by the transmitting circuit 101 is transmitted through a hybrid circuit in the error compensating circuit 103 and then output, but it is not limited.

Compared with the conventional signal transceiving circuit, the error calculating circuit 103 in the signal processing circuit 100 performs error calculation based on a part of the compensated input signal CIS received by the receiving end ADC 107, rather than based on a large amount of data from the output of the receiving end ADC 107. Therefore, only simple circuits and calculation steps are required.

Figure 2:
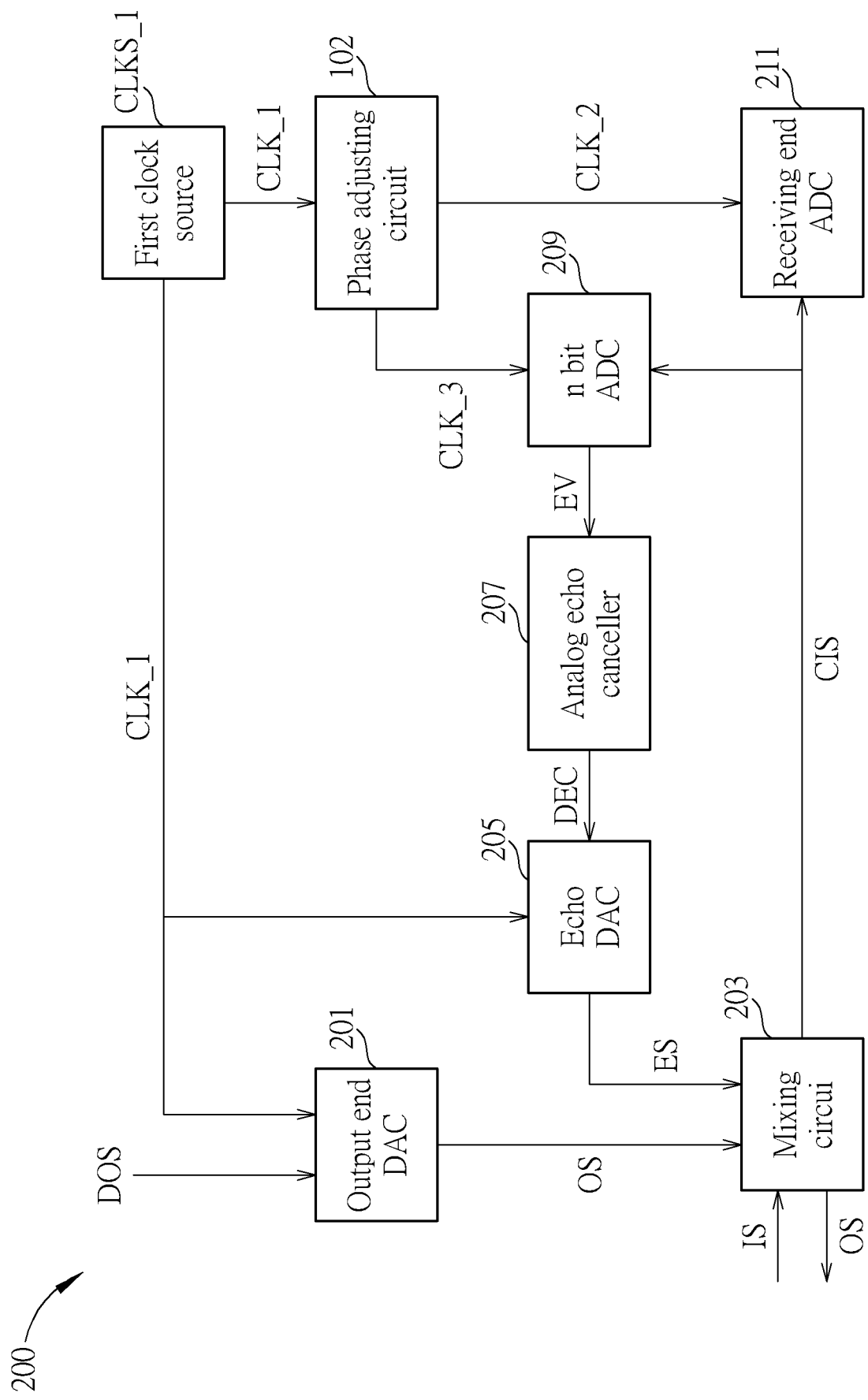
FIG. 2 is a more detail block diagram of the signal processing circuit illustrated in FIG. 1, according to one embodiment of the present invention.

FIG. 2 is a more detail block diagram of the signal processing circuit illustrated in FIG. 1, according to one embodiment of the present invention. Please note that the circuit shown in FIG. 2 is only for example, and all circuits which can achieve the same function should fall within the scope of the present invention. As shown in FIG. 2, the signal processing circuit 200 comprises a first clock source CLKS_1, an output end DAC (Digital to Analog Converter) 201, a mixing circuit (such as a hybrid circuit) 203, an echo DAC 205, an analog echo canceller 207, an n bit ADC 209, a receiving end ADC 211, and the above-mentioned phase adjusting circuit 102. The output end DAC 201 serves as the transmitting circuit 101 in FIG. 1, and the mixing circuit 203 serves as the error compensating circuit 103 in FIG. 1. The echo DAC 205, the analog echo canceller 207, and the n bit ADC 209 serve as the error calculating circuit 105 in FIG. 1.

Therefore, in the embodiment of FIG. 2, the output signal OS is an analog signal, and the output end DAC 201 converts a digital output signal DOS according to the first clock signal CLK_1 to generate the output signal OS. The mixing circuit 203 is configured to output the output signal OS, and to subtract the error signal ES from the input signal IS to generate the compensated input signal CIS. The n bit ADC 209 is configured to sample the compensated input signal CIS in a predetermined period according to the third clock signal CLK_3, and to output an error reference value EV of n bits, where n is a positive integer. In one embodiment, n is equal to 1. The n bit ADC 209 has the advantages of a simpler structure and can reduce the amount of data for error reference values. For example, if the n bit ADC 209 is a 1 bit ADC, the n bit ADC 209 samples the compensated input signal CIS within a predetermined period to generate multiple sample values (for example, 10), and then output a 1 bit error reference value based on these 10 sampled values. In one example, the 10 sampled values can be averaged to output a 1 bit error reference value. In one embodiment, the n bit ADC 209 outputs the LMS error (Least Mean Square error) of the compensated input signal CIS.

In one embodiment, the signal processing circuit 200 comprises a high pass filter and an amplifier between the mixing circuit 203 and the receiving end ADC 211. In such case, the compensated input signal CIS sampled by the n bit ADC 209 and received by the receiving end ADC 211 is a signal which has been processed by the high pass filter and the amplifier.

As mentioned above, in the embodiment in FIG. 2, the echo DAC 205, the analog echo canceller 207, and the n bit ADC 209 serve as the error calculation circuit 105 in FIG. 2. As shown in FIG. 2, the analog echo canceller 207 generates a digital error signal DES based on the output of the n bit ADC 209, and then the echo DAC 205 converts the digital error signal DES to an analog error signal ES. Various circuits can be used to implement the echo DAC 205 and the analog echo canceller 207, so detail descriptions thereof are omitted for brevity here. The phase adjusting circuit 102 is configured to receive the first clock signal CLK_1 and to adjust the phase of the first clock signal CLK_1 to generate the second clock signal CLK_2 and the third clock signal CLK_3 respectively. In one embodiment, the phase adjusting circuit 102 is a phase interpolation circuit.

In one embodiment, the receiving ADC 211 samples a first phase of the compensated input signal CIS, and the n bit ADC 209 samples a second phase of the compensated input signal CIS. The phase difference between the first phase and the second phase is larger than a predetermined phase difference. Since the signal value may be interfered when the signal is sampled, if the sampling times of different components are too close when sampling the same signal, the sampling may interfere with each other thus incorrect sampling values are acquired. Therefore, by making the phase difference between the first phase and the second phase larger, different components can be less likely to interfere with each other when sampling the same signal.

Figure 3:
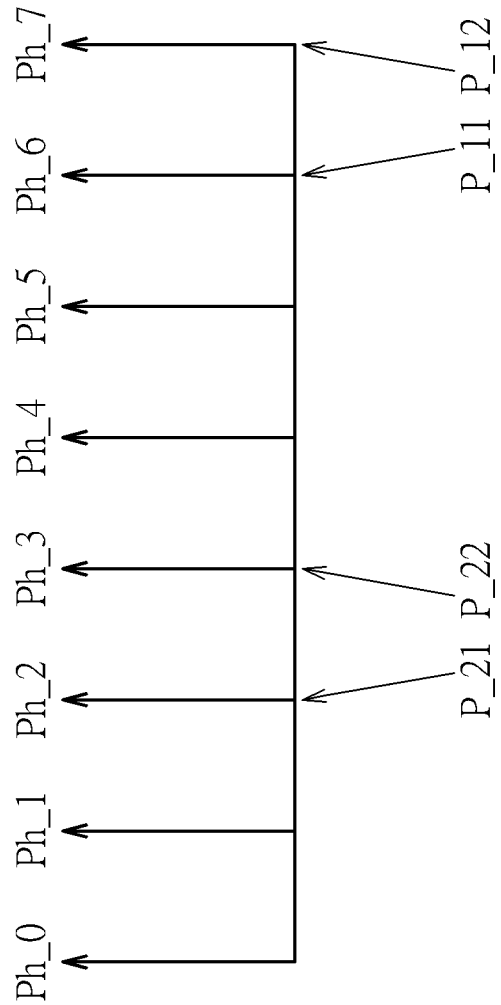
FIG. 3 is a schematic diagram illustrating sampling phase selection of the signal processing circuit illustrated in FIG. 2.

FIG. 3 is a schematic diagram illustrating sampling phase selection of the signal processing circuit illustrated in FIG. 2. Ph_0, Ph_1, Ph_2 . . . Ph_7 respectively represent different phases that the phase adjusting circuit 102 uses to adjust the first clock signal CLK_1. In this embodiment, the phase adjusting circuit 102 generates eight clock signals with different phases according to the first clock signal CLK_1. As shown in FIG. 3, the first phases P_11 and P_12 are interpolated to obtain the sampling phase which the receiving end ADC 211 uses to sample the compensated input signal CIS, and the second phases P_21 and P_22 are interpolated to obtain the sampling phase which the n bit ADC 209 uses to sample the compensated input signal CIS. It is shown in FIG. 3 that the first phases P_11 and P_12 and the second phases P_21 and P_22 respectively have a phase difference of at least two phases (Ph_4 and Ph_5) there between. That is, the first phases P_11, P_12 and the second phases P_21, P_22 are phases with large phase differences (or phases which are far away from each other). In one embodiment, the receiving end ADC 211 uses a plurality of first phases (such as P_11 and P_12) to interpolate a clock signal with a third phase to sample the compensated input signal CIS. The n bit ADC 209 uses a plurality of second phases (such as P_21 and P_22) to interpolate a clock signal with at least one phase to sample the compensated input signal CIS. However, if the n bit ADC 209 only samples once in a predetermined period and then outputs one error reference value, the n bit ADC 209 may use only one second phase to sample. In another embodiment, after it is determined that the clock signal used by the receiving end ADC 211 has the third phase, the phase that is farther from the third phase among the remaining phases can be dynamically selected. The selected phase can be used as the sampling phases of the clock signals used by the n bit ADC 209 (e.g. one of P_21 and P_22), to avoid that sampling times of the two ADCs are too close and affect each other.

Figure 4:
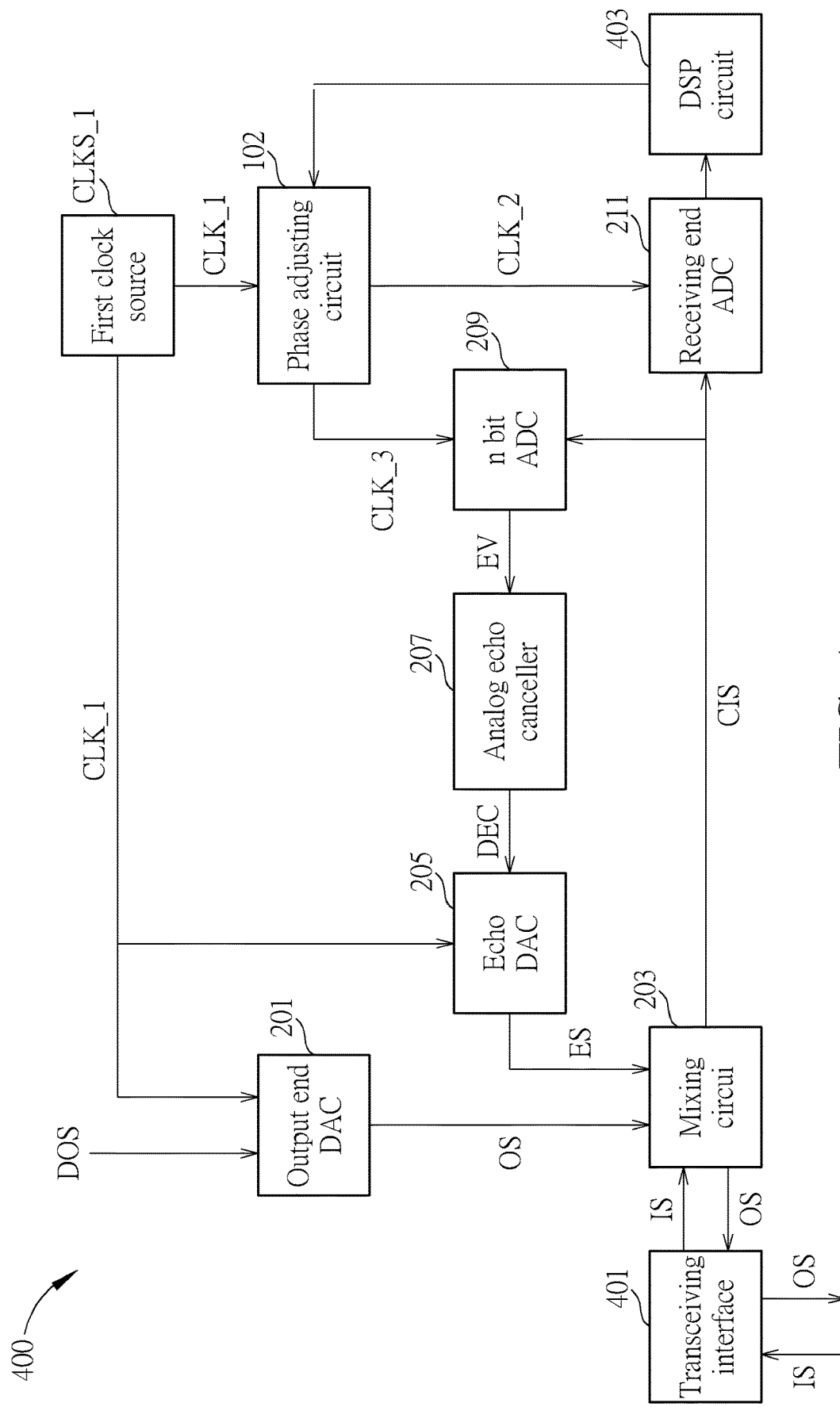
FIG. 4 is a block diagram illustrating that the signal processing circuit illustrated in FIG. 2 is applied to a network device.

FIG. 4 is a block diagram illustrating that the signal processing circuit illustrated in FIG. 2 is applied to a network device 400. In one embodiment, it is used in an Ethernet network device. In the embodiment of FIG. 4, in addition to the components of the embodiment shown in FIG. 2, the network device 400 further comprises a transceiving interface 401 and a DSP (Digital Signal Process, digital signal processing) circuit 403. The transceiving interface 401 is used to receive the input signal IS and the output signal OS, which can be a single transmitting line, a pair of transmitting lines, a single terminal, a single pin, or a single port. The DSP circuit 403 is used to process the output of the receiving end ADC 211 to provide it to subsequent circuits. In addition, in one embodiment, the DSP circuit 403 further controls the phase adjusting circuit 102 according to the output status of the receiving end ADC 211 to control the sampling phases of the receiving end ADC 211 and the n bit ADC 209. For example, the sampling phases of the receiving end ADC 211 and the n bit ADC 209 can be controlled according to the Signal to Noise Ratio (SNR) of the output signal of the receiving end ADC 211 or whether the output signal is easy to converge, but not limited.

Figure 5:
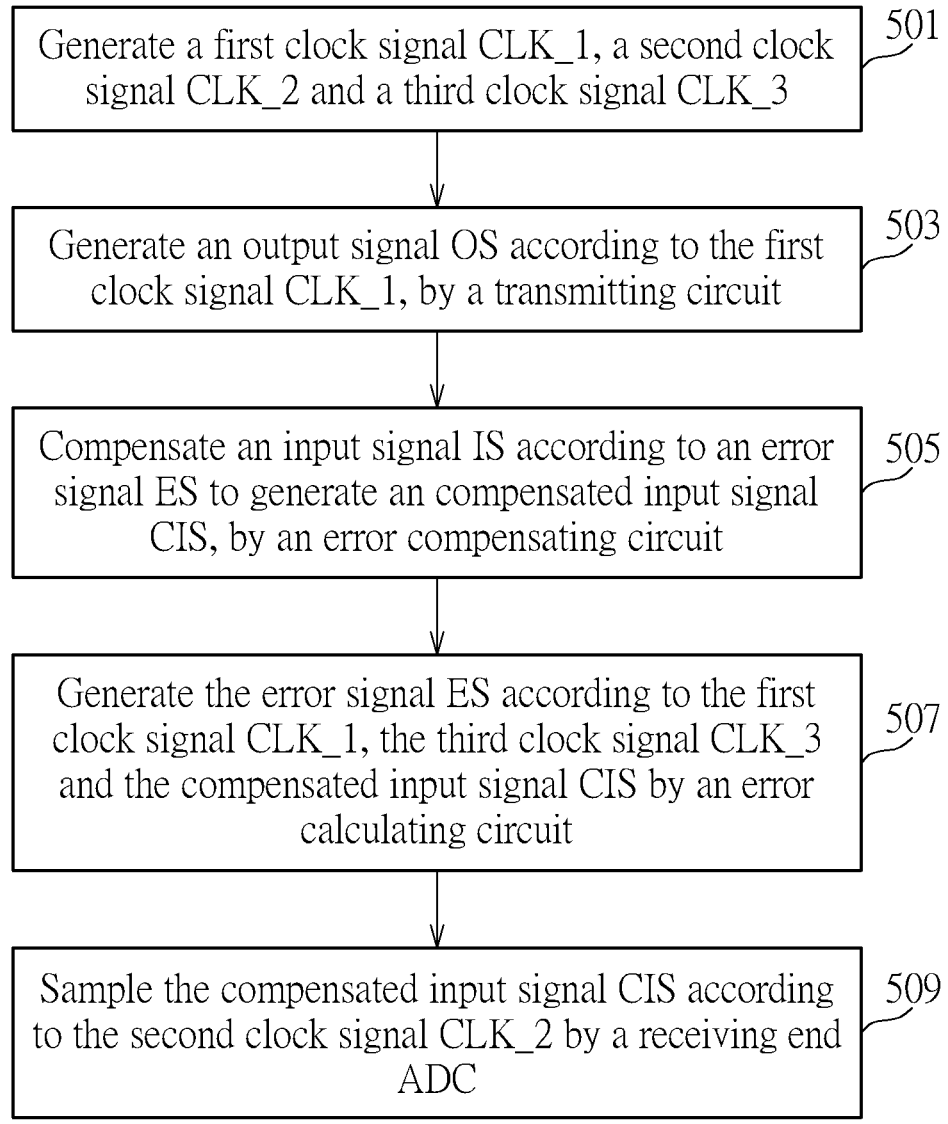
FIG. 5 is a flow chart illustrating a signal processing method according to one embodiment of the present invention.

FIG. 5 is a flow chart illustrating a signal processing method according to one embodiment of the present invention, which comprises following steps:

Step 501
Generate a first clock signal CLK_1, a second clock signal CLK_2 and a third clock signal CLK_3, wherein the second clock signal CLK_2 and the third clock signal CLK_3 have different phases.

Step 503
Generate an output signal OS according to the first clock signal CLK_1, by a transmitting circuit. In one embodiment, such step can be removed.

Step 505
Compensate an input signal IS according to an error signal ES to generate an compensated input signal CIS, by an error compensating circuit Step 507
Generate the error signal ES according to the first clock signal CLK_1, the third clock signal CLK_3 and the compensated input signal CIS by an error calculating circuit Step 509
Sample the compensated input signal CIS according to the second clock signal CLK_2 by a receiving end ADC.

Other detail steps have been disclosed in the foregoing embodiments, thus descriptions thereof are omitted for brevity here. It should be noted that the sequence of the steps depicted in the above-mentioned embodiments can be adjusted according to actual needs unless the sequence thereof is specifically stated. Also, the steps can be executed simultaneously or partially.

In summary, the signal processing circuit and the signal processing method provided in the present invention can perform error compensation (echo suppression) with a simpler circuit and less data, and can improve the issue of a conventional error calculating circuit: the circuit often requires a larger area or a more complicated calculating method. In addition, the sampling phases of different components can have a larger phase difference, so as to improve the inaccuracy of the sampling values due to that the sampling phases are too close.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A signal processing circuit, comprising:
   a first clock source, configured to generate a first clock signal;
   a phase adjusting circuit, configured to receive the first clock signal, and to generate a second clock signal and a third clock signal, wherein the second clock signal and the third clock signal have different phases;
   an error compensating circuit, configured to compensate an input signal according to an error signal, to generate an compensated input signal;
   an error calculating circuit, configured to generate the error signal according to the first clock signal, the third clock signal and the compensated input signal; and
   a receiving end ADC (analog to digital converter), configured to sample the compensated input signal according to the second clock signal.

2. The signal processing circuit of claim 1, further comprising:
   a transmitting circuit, configured to generate an output signal according to the first clock signal;
   wherein the transmitting circuit is an output end DAC (digital to analog converter) and the output signal is an analog signal;
   wherein the transmitting circuit is configured to convert a digital output signal to generate the output signal according to the first clock signal.

3. The signal processing circuit of claim 1, wherein the error calculating circuit comprises:
   an n bit ADC, configured to sample the compensated input signal to output n bit of error reference value in a predetermined period according to the third clock signal, wherein n is a positive integer;
   wherein the error calculating circuit generates the error signal according to the error reference value.

4. The signal processing circuit of claim 3, wherein the n bit ADC is a 1 bit ADC.

5. The signal processing circuit of claim 3, wherein the second clock signal has a first phase and the third clock signal has a second phase, wherein a phase difference between the first phase and the second phase is larger than a predetermined phase difference.

6. The signal processing circuit of claim 5, further comprising a digital signal processing circuit, configured to control the phase adjusting circuit to control sampling phases of the receiving end ADC and the n bit ADC according to a status of an output of the receiving end ADC.

7. The signal processing circuit of claim 5, wherein the phase adjusting circuit is a phase interpolation circuit.

8. The signal processing circuit of claim 3, wherein the second clock signal comprises a plurality of first phases.

9. The signal processing circuit of claim 8, wherein the receiving end ADC interpolates a plurality of the first phases to generate a third phase to sample the compensated input signal.

10. A signal processing method, comprising:
   (a) generating a first clock signal, a second clock signal and a third clock signal, wherein the second clock signal and the third clock signal have different phases;
   (b) compensating an input signal according to an error signal to generate an compensated input signal, by an error compensating circuit;
   (c) generating the error signal according to the first clock signal, the third clock signal and the compensated input signal by an error calculating circuit; and
   (d) sampling the compensated input signal according to the second clock signal by a receiving end ADC (digital to analog converter).

11. The signal processing method of claim 10, further comprising:

generating an output signal according to the first clock signal, by a transmitting circuit;

wherein the transmitting circuit is an output end DAC (digital to analog converter) and the output signal is an analog signal;

wherein the transmitting circuit is configured to convert a digital output signal to generate the output signal according to the first clock signal.

12. The signal processing method of claim 10, wherein the step (d) comprises:

sampling the compensated input signal to output n bit of error reference value in a predetermined period according to the third clock signal, by an n bit ADC, wherein n is a positive integer; and generating the error signal according to the error reference value, by the error calculating circuit.

13. The signal processing method of claim 12, wherein the n bit ADC is a 1 bit ADC.

14. The signal processing method of claim 12, wherein the second clock signal has a first phase and the third clock signal has a second phase, wherein a phase difference between the first phase and the second phase is larger than a predetermined phase difference.

15. The signal processing method of claim 14, further comprising:

controlling the phase adjusting circuit to control sampling phases of the receiving end ADC and the n bit ADC according to a status of an output of the receiving end ADC.

16. The signal processing method of claim 15, wherein the phase adjusting circuit is a phase interpolation circuit.

17. The signal processing method of claim 12, wherein the second clock signal comprises a plurality of first phases.

18. The signal processing method of claim 17, further comprising:

interpolating a plurality of the first phases to generate a third phase to sample the compensated input signal, by the receiving end ADC.

* * * * *